United States Patent

Laing

[15] 3,664,210

[45] May 23, 1972

[54] TRANSMISSION MECHANISM AND METHOD OF MANUFACTURE THEREOF

[72] Inventor: James Morrison Laing, Letchworth, England

[73] Assignee: Borg-Warner Limited, Letchworth, England

[22] Filed: July 17, 1970

[21] Appl. No.: 55,771

[30] Foreign Application Priority Data

July 29, 1969  Great Britain......................38,121/69

[52] U.S. Cl...............................74/753, 29/471.1, 74/763, 113/116 D
[51] Int. Cl...................................F16h 57/00, B21d 51/00
[58] Field of Search..................74/759, 762, 763, 449, 753; 29/471.1; 113/116 D

[56] References Cited

UNITED STATES PATENTS

| | | | |
|---|---|---|---|
| 2,856,794 | 10/1958 | Simpson | 74/763 |
| 3,319,491 | 5/1967 | Simpson | 74/753 X |
| 3,527,121 | 9/1970 | Moore | 74/801 X |
| 2,855,803 | 10/1958 | Knowles | 74/763 X |

Primary Examiner—Carlton R. Croyle
Assistant Examiner—Thomas C. Perry
Attorney—Robert L. Zeig

[57] ABSTRACT

A torque transmitting member, and a transmission mechanism, such as an automatic transmission, in which the member is formed from sheet metal and comprises a central radial portion and forwardly and rearwardly axially extending portions connecting the member to elements of two planetary gear sets and to a torque transmitting shaft. The member may be formed by drawing an annular sheet metal part to form a radially and an axially rearwardly extending portion, severing sections in the area between these portions and bending the severed sections forwardly to form the forwardly extending portion.

10 Claims, 1 Drawing Figure 3,664,210
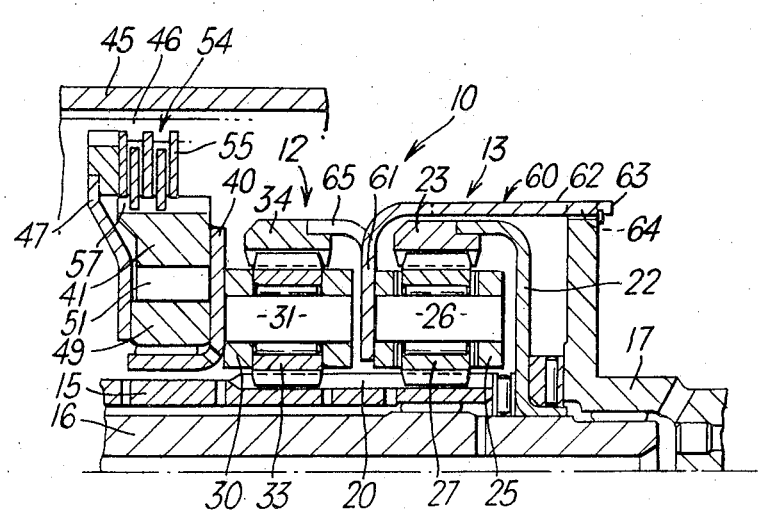
Inventor
JAMES MORRISON LAING
By Robert L. Zieg
Attorney

TRANSMISSION MECHANISM AND METHOD OF MANUFACTURE THEREOF

This application relates to a novel torque transmitting member for use in a planetary gear set and to a method of manufacture thereof. It is conventional in automatic transmissions for example as shown in British Specification No. 973,494, for the gear sets to be interconnected by a member which is formed by casting and machining.

According to the present invention there is provided a torque transmitting member for a transmission mechanism having a plurality of planetary gear elements and a torque transmitting shaft, said member being adapted to be connected to at least two of said gear set elements and to said shaft, said member being formed of sheet metal and having a central radial portion and forwardly and rearwardly extending axial portions, to connect said torque transmitting member to said two gear set elements and said shaft.

With such a member, the manufacture is less expensive and the transmission mechanism can be more compact.

According to a further aspect there is provided a method of manufacturing the torque transmitting member of the invention, such method comprising the steps of (a) providing a tubular or annular shaped sheet metal part; (b) drawing a portion of said annular part to form a radially extending portion and a first axially extending portion; (c) partially severing portions from said part in the area between said radially and axially extending portions and (d) bending said severed portions forwardly to provide second axially extending portions extending in the opposite direction from said radial portion as compared to said first axially extending portion.

The invention also provides a transmission mechanism incorporating a member according to the invention, i.e. a mechanism comprising a plurality of planetary gear elements and a torque transmitting shaft, and a torque transmitting member connected to two of said gear set elements and to said shaft, said member being formed of sheet metal and having a central radial portion and forwardly and rearwardly extending axial portions, connecting said torque transmitting member to said two gear set elements and said shaft.

In order that the invention may more readily be understood, the following description is given, merely by way of example, reference being made to the accompanying drawing in which the single FIGURE represents a cross-section through a transmission mechanism incorporating the present invention.

Referring to the drawing, there is shown a transmission mechanism 10 comprising a pair of planetary gear sets 12 and 13 connected between a pair of input shafts 15 and 16 and an output shaft 17. Formed on the input shaft 15 are gear teeth 20 which constitute a sun gear for each of the planetary sets 12 and 13.

Connected to input shaft 16, by welding for example, is a drum 22. Joined to the drum 22, for example by welding, is an annulus gear 23 for the planetary gear set 13. A planetary carrier 25 is provided for gear set 13 which supports a plurality of shafts 26, each having a planetary pinion gear 27 journalled thereon. Gears 27 mesh with the sun gear teeth 20 and the annulus gear 23.

A planetary carrier 30 is provided for gear set 12 having a plurality of shafts 31 thereon each supporting a planetary pinion gear 33. An annulus gear 34 is provided for gear set 12, the planetary pinion gears 33 meshing with the sun gear teeth 20 and annulus gear 34. Joined to planetary carrier 30, for example by welding, is a brake plate 40 which has joined thereto a race 41. A portion of the transmission case 45 is illustrated which has internal splines 46. Drivingly connected to the splines 46 is a plate 47 which is thus a stationary plate. Joined to the stationary plate 47, as for example by welding, is a race 49. A one-way brake device 51, which may be of the roller or sprag type, for example, is mounted between the stationary race 49 and race 41. A brake mechanism 54 is provided which includes a plurality of plates 55, certain of which are splined to the transmission case 45, and others of which are drivingly connected to splines 57 on the race member 41. A mechanism not illustrated is provided to actuate the brake mechanism 54.

Joined to the planetary carrier 25 and the annulus gear 34, for example by welding in each instance, is an annular torque transmitting member 60, which has a radially extending portion 61 thereon joined to planetary carrier 25 and an axially rearwardly extending annular portion 62. The portion 62 is slotted at 63 so as to drivingly engage teeth 64 provided on output shaft 17. In addition, a forwardly axially extending portion 65 is provided on the member 60 which is joined to the annulus gear 34. As will be clear from the description of operation, the member 60 constitutes the final drive connection from gear sets 12 and 13 to output shaft 17. In known transmissions of this type it is common practice to use heavy forged parts having complex connections to various elements of the transmission and to be connected to the output shaft 17.

The member 60 is conveniently made from sheet metal and may be formed by the following manufacturing steps: providing a tube-like annular member, performing a drawing operation or similar deforming process to form radial extending portion 61 and axial extending portion 62, forming axially forwardly extending portions 65 by partially severing same from member 60 in the area of the juncture of portions 61 and 62 and bending portions 65 forwardly, forming the slots 63, welding annulus gear 34 to portion 65, and welding portion 61 to carrier 25.

The operation of the transmission unit in general is that clutch means are provided, not illustrated, which can provide for input drive either to input shaft 15 or input shaft 16. First gear is provided by input shaft 16 driving annulus gear 23, the one-way brake device 51 providing the reaction for the gear set by holding race 41 and planetary carrier 30 stationary, so that a one-way first gear drive is provided. A manually selectable two-way drive is provided by engagement of brake mechanism 54 which holds planetary carrier 30 stationary preventing rotation in either direction. A second drive ratio is available by the clutch means providing for driving shaft 16 in turn driving annulus gear 23 and engaging a brake mechanism, not illustrated, to hold shaft 15 and sun gears 20 stationary. A third direct drive ratio is provided by engagement of the clutches, not illustrated, to connect shafts 15 and 16 together thereby locking up the gear set and providing direct drive to output shaft 17. As can be seen from the description of operation, the member 60 is the main drive connection from the gear set to the output shaft 17. Conveniently, the torque transmitting member 60 is formed from a single annular sheet metal part which is adaptable for joining with elements of two gear sets and with an output shaft.

I claim:

1. A torque transmitting member for a transmission mechanism having a plurality of planetary gear elements and a torque transmitting shaft, said member being adapted to be connected to at least two of said gear set elements and to said shaft, said member being formed of sheet metal and comprising a central radial portion and forwardly and rearwardly extending axial portions, effective to connect said torque transmitting member to said two gear set elements and said shaft, and one of said extending axial portions being formed by partially severing sections from said other extending axial portion and subsequently bending said severed sections toward a desired axial direction.

2. A torque transmitting member as claimed in claim 1 wherein said forwardly extending portion is adapted to be connected to an element of one of said gear sets and said central radial portion is adapted to be connected to an element of said other gear set.

3. A torque transmitting member as claimed in claim 2, wherein said rearwardly extending portion has means formed thereon for connection to said shaft.

4. A torque transmitting member as claimed in claim 1, wherein said forwardly extending portion is formed by partially severing sections from said rearwardly extending portion, for example by punching and subsequently bending said portions forwardly.

5. A transmission mechanism comprising a plurality of planetary gear elements and a torque transmitting shaft, and a torque transmitting member connected to two of said gear set elements and to said shaft, said member being formed of sheet metal and having a central radial portion and forwardly and rearwardly extending axial portions, connecting said torque transmitting member to said two gear set elements and said shaft, and one of said extending axial portions being formed by partially severing sections from said other extending axial portion and subsequently bending said severed sections toward a desired axial direction.

6. A mechanism as claimed in claim 5, wherein said forwardly extending portion is connected to an element of one of said gear sets, said central radial portion is connected to an element of the other gear set and said rearwardly extending portion is connected to said shaft.

7. A mechanism as claimed in claim 6, wherein said shaft is formed with teeth and said rearwardly extending portion is provided with slots engaging said teeth.

8. A method of forming a torque transmitting member for a transmission mechanism comprising the steps of (a) providing a tubular or annular shaped sheet metal part; (b) drawing a portion of said annular part to form a radially extending portion and a first axially extending portion; (c) partially severing portions from said part in the area between said radially and axially extending portions; and (d) bending said severed portions forwardly to provide second axially extending portions extending in the opposite direction from said radial portion as compared to said first axially extending portion.

9. A method as claimed in claim 8 including the steps of forming slots in said first axially extending portion to provide for connection to a transmission element.

10. A method as claimed in claim 8 including the further steps of welding said radially extending portion to a gear set element and welding said axially extending portion to another gear set element.

* * * * *